W. McLucas.
Corn-Planter.
No. 74112.　　　　　Patented Feb. 4, 1868.
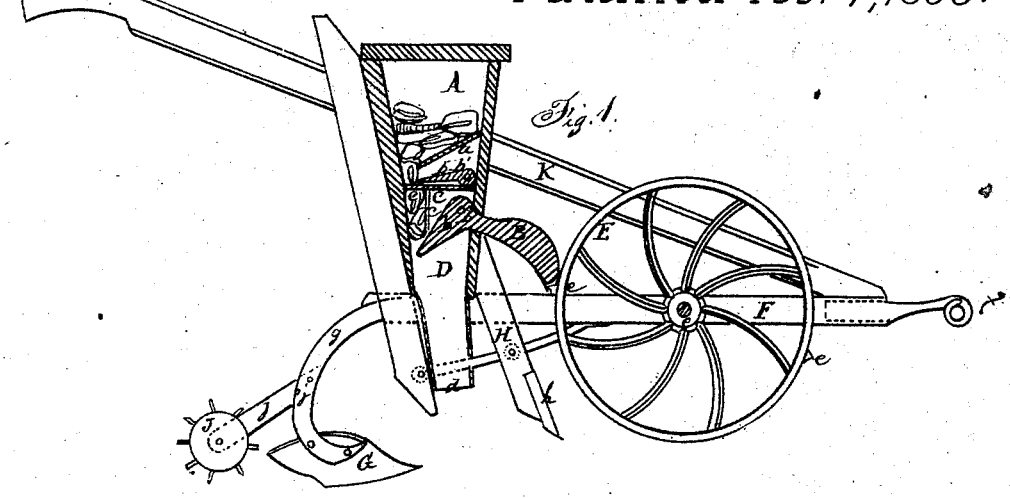
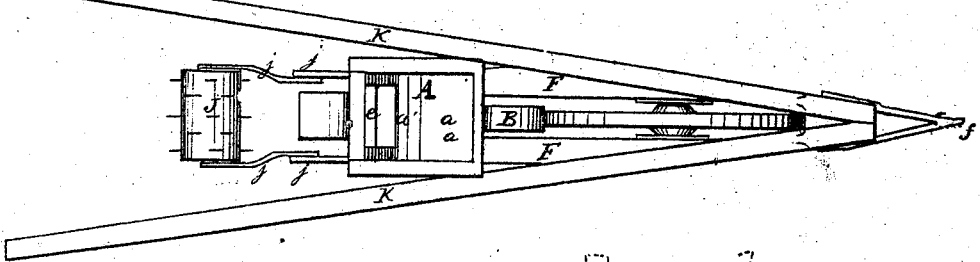
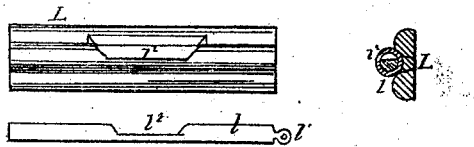 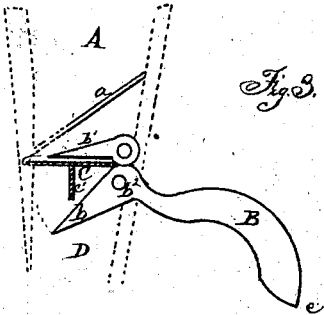 
Witnesses
John D. Blair
Edm. James
Inventor
W. McLucas
per Holmead & Hollingshead
Attys

United States Patent Office.

WILLIAM McLUCAS, OF REINERSVILLE, OHIO.

Letters Patent No. 74,112, dated February 4, 1868.

IMPROVEMENT IN CORN-PLANTERS.

*The Schedule referred to in these Letters Patent and making part of the same.*

TO ALL WHOM IT MAY CONCERN:

Be it known that I, WILLIAM McLUCAS, of Reinersville, county of Morgan, and State of Ohio, have invented certain new and useful Improvements in Corn and Seed-Planters; and I do hereby declare that the following is a full, clear, and exact description of the same, reference being had to the annexed drawings, and to the letters of reference marked thereon, and making part of this specification, in which—

Figure 1 is a longitudinal section.

Figure 2 is a plan view.

Figure 3, sections of the lever-arrangement and hopper.

Figure 4, sections of equivalent feed-valve.

The nature of my invention consists in the combination of a lever with two valves, operated upon by cogged wheel, and the hopper of any ordinary seed-planter, with trenching-ploughs to close the drills, and a following-harrow to level and pulverize the ground. The difficulties which accompany most seed-planters grow out of the irregularity of supply from the hopper; hence the hills of corn, or the drills for cotton, are so diverse in the quantities. In my invention this is strictly regulated by the distance of the cogs upon the wheel, which can be made adjustable for different distances of hills, or a separate wheel can be used for each particular distance. The ploughs, which follow the seed dropped, immediately cover the grain, and then the roller, with its sharp spines, cuts up the ground and rolls it firmly upon the seed.

To enable others skilled in the art to make and use my invention, I will proceed to describe its construction and mode of operation.

In the drawings, A is the inside of the upper hopper; B is the lever; C, the partition between upper and lower hopper; D, the lower hopper; E, the wheel; F F, the plough-beams; G G, the ploughshares; H, the shovel-plough; J, the harrow-roller; K K, the handles; L is a valve, which can be used as equivalent to B; $a$ is the sloping bottom of upper hopper, with a small opening, $a'$; $b$ is the valve-end of the lever B; $b^1$, the upper valve, jointed to the neck of lever B at $b^3$, in fig. 3, by means of a rivet-joint; $b^2$ is the pin which passes through the lever, and is supported in the sides of the hopper, and is the fulcrum for the motion of lever B; $c$ is a small opening in the division C, between the upper and lower hoppers, and through which the grain passes; $C'$ is a vertical partition to prevent the grain from slipping on to the lever, and to form a box to hold the definite quantity; $d$ is the outlet of hopper D, just in rear of the shovel-plough, $h$; $e$, the cogs of wheel E; $f$, the clevis or hook; $g\,g$, the arms by which ploughs G G are fastened to plough-stocks F F; $h$, the shovel-plough to run the drills; $j\,j$ are arms of roller, fastened, at $j'\,j'$, to the arms $g\,g$; $l$ is a slide, made circular, and to fit into the hollow cylinder, L, which has a hole on the bottom side, and the slot in $l$ at $l'$ is so arranged that when, by the handle $l'$, the slide $l$ is pulled out, the slot comes over the hole in L, and thus permits a certain number of seed to drop, and when the wheel moves the slide back, or a spring can be arranged to return it, the supply is cut off.

The arrangements are so simple that the description of the drawings will fully explain the operation. The valve acts similarly to those in an ordinary shot-pouch. When the machine is at rest, the corn or other seed in the hopper will settle into the lower part of the upper hopper, and rest upon the lower valve. When the wheel is put in motion, the cog will lift up the end of the lever and withdraw the lower valve, but, at the same time, slide in the upper valve, and only permit the requisite number of grains to drop into the lower hopper, and from thence to the ground. When the cog has passed, the weighted arm immediately drops and closes the lower orifice, and opens the upper for a fresh supply. The drill-shovel plough opens the furrow, the seed is dropped regularly into it, and the covering-ploughs follow and cover the seed; the roller-harrow then pulverizes, levels, and rolls the ground smoothly upon the seed.

Having thus described my invention and mode of operation, what I claim as new therein, and desire to secure by Letters Patent of the United States, is—

1. The combination of a lever, B, with its valves, $b$ and $b^1$, operated by a wheel, E, with seed-hopper A and D, all substantially as described.

2. In combination with the foregoing, the ploughshares G G, and harrow-roller $g$, substantially as and for the purpose specified.

In testimony whereof, I have signed my name to this specification in the presence of two subscribing witnesses.

WILLIAM McLUCAS.

Witnesses:
 EPHRAIM BIRCH,
 GEO. BIRCH.